US008369431B2

(12) United States Patent
Walker et al.

(10) Patent No.: US 8,369,431 B2
(45) Date of Patent: Feb. 5, 2013

(54) PEAK-TO-AVERAGE POWER REDUCTION METHOD

(75) Inventors: Brian Walker, Halifax (CA); Philipp Schmid, Hackett's Cove (CA)

(73) Assignee: Nautel Limited, Hackett's Cove, Nova Scotia (CA)

( * ) Notice: Subject to any disclaimer, the term of this patent is extended or adjusted under 35 U.S.C. 154(b) by 172 days.

(21) Appl. No.: 12/810,146

(22) PCT Filed: Jan. 25, 2008

(86) PCT No.: PCT/CA2008/000169
§ 371 (c)(1),
(2), (4) Date: Jun. 22, 2010

(87) PCT Pub. No.: WO2009/092150
PCT Pub. Date: Jul. 30, 2009

(65) Prior Publication Data
US 2010/0272221 A1      Oct. 28, 2010

(51) Int. Cl.
*H04K 1/10* (2006.01)
(52) U.S. Cl. .................................. 375/260; 375/295
(58) Field of Classification Search .............. 375/260, 375/295, 296, 350; 343/860
See application file for complete search history.

(56) References Cited

U.S. PATENT DOCUMENTS

| 6,549,564 | B1 | 4/2003 | Popovic | |
|---|---|---|---|---|
| 6,735,257 | B2 * | 5/2004 | Kroeger | 375/295 |
| 7,233,625 | B2 * | 6/2007 | Ma et al. | 375/260 |
| 7,982,683 | B2 * | 7/2011 | Peyla et al. | 343/860 |
| 2002/0168016 | A1 | 11/2002 | Wang et al. | |
| 2004/0146115 | A1 * | 7/2004 | Feng et al. | 375/260 |
| 2005/0169411 | A1 * | 8/2005 | Kroeger | 375/350 |
| 2006/0291584 | A1 * | 12/2006 | Dittmer | 375/296 |

FOREIGN PATENT DOCUMENTS
WO        2005076560 A1    8/2005

* cited by examiner

*Primary Examiner* — Daniel Washburn
*Assistant Examiner* — Fitwi Hailegiorgis
(74) *Attorney, Agent, or Firm* — Vincent K. Gustafson; Jenkins, Wilson, Taylor & Hunt, P.A.

(57) ABSTRACT

A method of reducing peak-to-average power in a hybrid signal is provided. The method determines peaks in power by defining a sample point by way of a digital vector and an analog vector. The digital and analog vectors are added together to generate a hybrid vector which is used to compare the sample point to the maximum desired peak threshold. An error vector is used to correct the sample point to a desired power level. Once the sample point has been corrected it can be added back to the analog signal and transmitted.

19 Claims, 3 Drawing Sheets

PEAK-TO-AVERAGE POWER REDUCTION METHOD

CROSS-REFERENCE TO RELATED APPLICATIONS

This application is a U.S. national phase application under the provisions of 35 U.S.C. §371 of International Patent Application No. PCT/CA08/00169 filed on Jan. 25, 2008. The disclosure of such international application is hereby incorporated by reference herein in its entireties, for all purposes.

FIELD OF THE INVENTION

The present invention relates generally to a method for reducing peak-to-average power in a hybrid signal comprising first and second separately modulated signals. More specifically, the invention relates to a peak-to-average power method for use on a hybrid digital/analog radio frequency signal.

BACKGROUND OF THE INVENTION

In the United States, the In-Band On-Channel (IBOC) technology, referred to as HD Radio™, has been selected by the Federal Communication Commission to be the standard for simulcast digital programming along with traditional analog audio at the same frequency band. In other jurisdictions, other standards have been adopted. For example, several European Union countries have implemented Digital Audio Broadcasting (DAB) for FM broadcasts and Digital Radio Mondiale (DRM) for AM broadcasts.

HD Radio™ IBOC technology is proprietary to iBiquity Digital Corporation, which develops and licenses the various components and technologies required for HD Radio™. As such, the instructions provided with the equipment and technology, and training provided by iBiquity forms the common general knowledge in this field and allows the technology to be put into practice.

IBOC makes use of orthogonal frequency division multiplexing (OFDM) signalling. While it can be shown that OFDM provides substantial benefits in digital wireless communications, one of its main disadvantages is the fact that in the time domain the multitude of subcarriers add constructively or destructively almost at random. This produces a time domain signal with widely varying power.

A high level combined broadcast transmission system takes the output from a full power analog transmitter and combines it with the signal from a linear digital transmitter before sending it to the antenna. In this case, the digital power amplifier must be able to handle the full range of the digital signal's power fluctuation. In order to make IBOC deployments economically feasible, peak-to-average power (PAPR) algorithms have been developed to reduce the power peaks in the digital signal. For example, U.S. Pat. No. 6,128,350 to Shastri et al., and US Patent Publication No. 2005/0169411 to Kroeger both describe PAPR algorithms for use on the digital signal in IBOC systems. These standard algorithms effectively brings the original 12 dB PAPR under 8 dB by solely operating on the digital signal.

Conversely, a low level combined broadcast transmission system consists of a single combined power amplification chain. In this case the analog and digital signals are added as digital complex baseband signals. The addition of the analog signal to the digital signal generates a hybrid signal and alters the power characteristics of the combined signal.

FIGS. 1A-C illustrates a complex plane, where the X-axis reflects the baseband signal's real (or in phase-I) component and the Y-axis represents the signal's imaginary (or quadrature-Q) component. As shown in FIG. 1A, the output of the FM modulation process produces a constant envelope signal with varying phase. At baseband, this signal is represented as a vector 120 in the complex plane with constant amplitude, which is represented by a circle 107. Any given sample point can be represented by an additive vector 110, which represents the possible amplitude and phase of the additive digital signal.

In theory, as shown in FIG. 1B, the standard PAPR reduction scheme creates a circle 140 having a radius that is equal to or less than the distance between the constant FM signal level and the maximum desired peak threshold 112. Only sample points that fall within this circle 140 can be certain not to add to the analog signal 102 constructively, and thus do not require correction. However, all sample points that fall outside of the circle 140 will require correction to a point within the circle 140. For example, sample points 150, 151 and 152, defined by digital vectors 110A, 110B and 110C, respectively, will all require correction to be within the confines of circle 140.

However, this form of peak detection results in the digital signal being unnecessary corrected in a variety of circumstances and large corrections being applied when much less correction is required. For example, as shown in FIG. 1C, sample point 152 defined by digital vector 110B would be corrected by correction vector 160, when in fact no correction would be necessary, since the actual sample point 152 would fall below the maximum desired threshold 112.

Sample point 150, defined by digital vector 110C, illustrates the situation where a large correction would be applied to a sample point requiring only a small correction. In this example, digital vector 110C projects to a point 150 that is just beyond the maximum desired peak threshold 112. In the standard PAPR reduction scheme, a large correction 161 would be applied to this vector 110C to bring the sample point into the circle 140, whereas in reality a small correction function could have been used to bring the sample point 150 below the maximum desired peak threshold 112. Only in circumstances where the digital vector could add to the analog vector in-phase to generate a maximum peak does the current PAPR reduction scheme apply proper clipping or correction. For example, sample point 151 defined by digital vector 110A generates a maximum peak, in which a proper correction vector 162 is applied.

Accordingly, there is a need to develop a method that does not unnecessarily reduce peaks in power that fall within the maximum desired peak threshold and therefore overcomes the limitations of the prior art.

SUMMARY OF THE INVENTION

It is an object of the present invention to provide a peak detection method that overcomes the limitations of the prior art and is applied to a hybrid signal.

It is a further object of the present invention to provide a method for peak detection that takes into account the contribution of each separately modulated signal and uses this information in reducing the PAPR in the hybrid signal.

According to an aspect of the present invention there is provided a method for peak-to-average power reduction in a hybrid signal comprising first and second separately modulated signals, the method comprising the steps of: obtaining a sample point of the hybrid signal; defining the sample point by way of a first vector corresponding to the first separately modulated signal and a second vector corresponding to the second separately modulated signal; adding the first vector to the second vector to obtain a hybrid vector; comparing the hybrid vector against a maximum desired peak threshold to identify peaks in power; and adding an error vector to the second vector to reduce the peak.

BRIEF DESCRIPTION OF THE DRAWINGS

These and other features, aspects and advantages of the present invention will become better understood with regard to the following description and accompanying drawings wherein.

DETAILED DESCRIPTION OF THE INVENTION

The following description is of one particular embodiment by way of example only and without limitation to the combination of features necessary for carrying the invention into effect.

As a representative example, description of the method is given using hybrid FM IBOC broadcast transmission. However, persons of ordinary skill in the art will readily understand that the general method, software and system can be applied to other hybrid transmission schemes that add two separately modulated signals, such as an OFDM signal and an existing transmission standard.

It should be also noted that the present invention can be carried out as a method, can be embodied in a system, a computer readable medium or an electrical or electro-magnetical signal.

Figure 2:
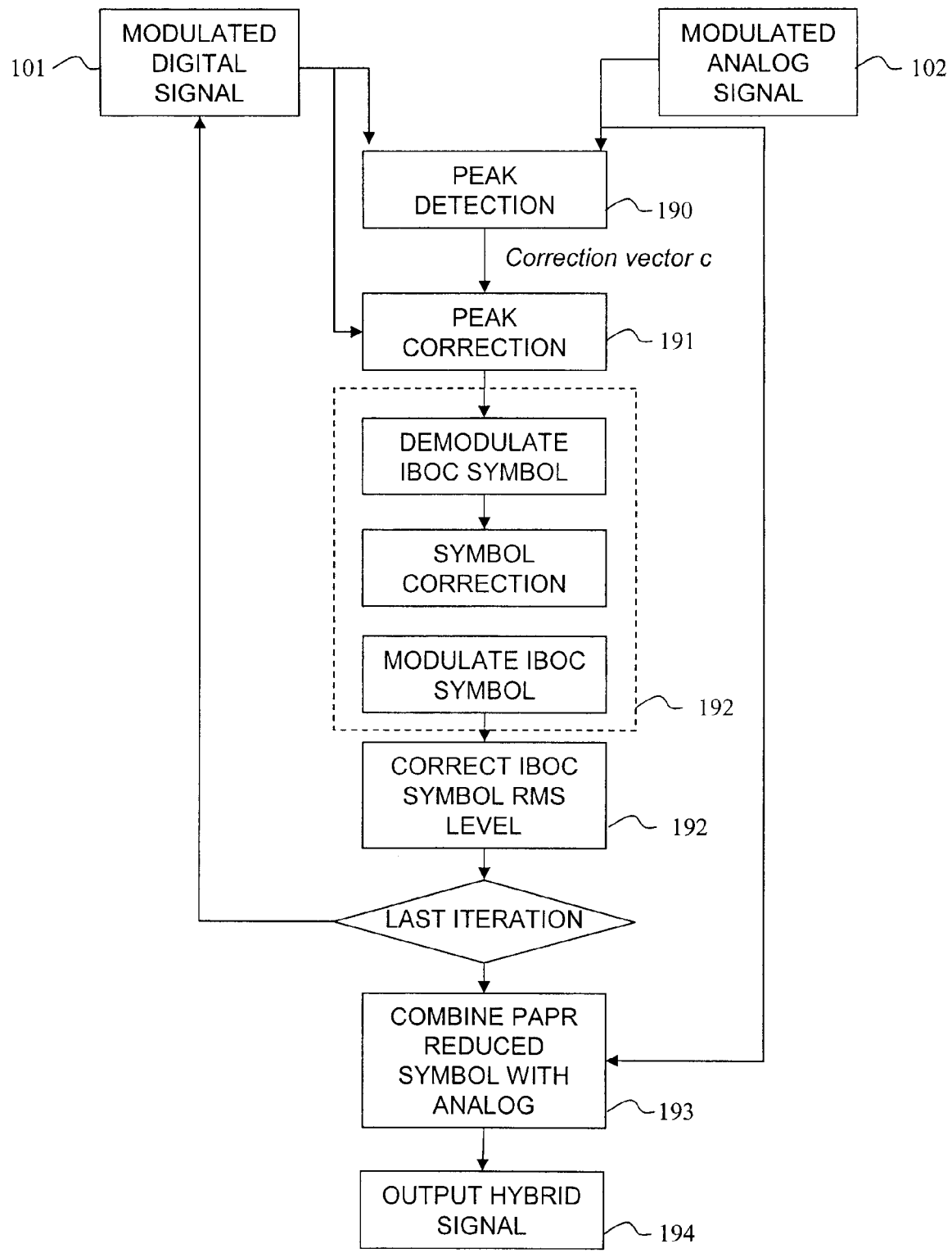
FIG. 2 is a block diagram of the peak-to-average power scheme of the present invention.

As shown in FIG. 2, in a standard low level combined broadcast transmission system, the digital and analog signals 101, 102 of the FM IBOC broadcast transmission converge to form a hybrid signal. Each signal 101 and 102 is separately modulated prior to convergence. In the present example, the digital signal 101 is modulated in accordance with an IBOC modulation scheme and the analog signal is modulated using a standard frequency modulation scheme. Peaks are detected, as shown by block 190, by taking sample points within the hybrid signal and comparing them against the maximum desired peak threshold. Any peak detected is then reduced, as shown by block 191, to below the maximum desired peak threshold. From this point the signal may be further corrected by spectrum and constellation correction 192 or passed forward without further correction to the next step in the broadcast stream. Several iterations of the method can take place before the digital and analog signals 101, 102 are recombined, as shown by block 193, to be output as a hybrid signal (block 194).

In this low level combined broadcast system, it has been found that if the hybrid signal is also modulated, then a PAPR of around 3 dB can be achieved even with a increase in carrier levels of up to 10 dB. Comparatively, using the standard IBOC PAPR methods, as described in Shastri et al., (U.S. Pat. No. 6,128,350) and Kroeger (US 2005/0169411), a transmitter capable of handling a PAPR of up to 4.5 dB will be required to accommodate the 10 dB increase in digital carrier levels. This will result in a dramatic increase in transmitter overhead.

The standard PAPR reduction methods developed for IBOC broadcast transmission, such as Shastri et al., (U.S. Pat. No. 6,128,350) and Kroeger (US 2005/0169411), are suboptimal for use on the hybrid signal 100. This is in part due to the fact that applying the PAPR reduction algorithms of Shastri et al., (U.S. Pat. No. 6,128,350) and Kroeger (US 2005/0169411) on the hybrid signal 100 would obliterate the analog signal 102 content. In order for PAPR reduction to take place on the hybrid signal 100 the sections of the signal that contribute to the development of a peak should be identified.

According to the present invention a signal peak, which is defined as a sample point exceeding a maximum desired threshold, is determined by adding the analog vector to the digital vector. The resultant hybrid vector is then thresholded against the maximum desired peak threshold. If the digital signal adds constructively to the analog signal, then a large correction will be required. A smaller correction is needed, if the vector addition falls close to the maximum desired peak and no correction is required if the digital signal adds destructively to the analog signal and resultant hybrid vector projects below the maximum desired peak threshold.

Figure 1:
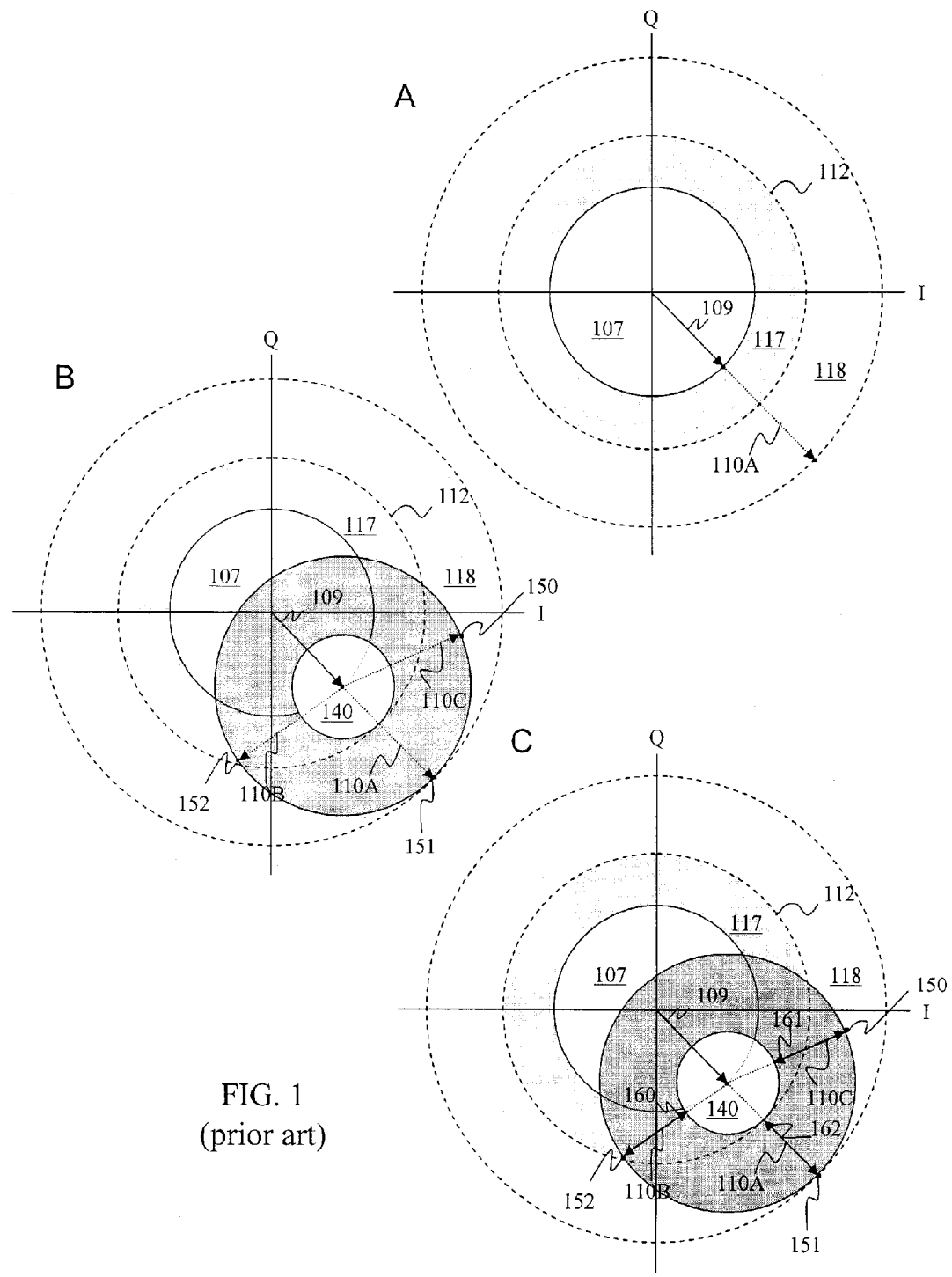
FIG. 1A is a complex plane, where the X-axis reflects the in phase (I) component and the Y-axis represents the signal's quadrature (Q) component.
FIG. 1B is a complex plane depicting the addition of a digital vector to an analog vector in accordance with the prior art.
FIG. 1C is a complex plane depicting correction of the digital vectors in accordance with the prior art.
Figure 3:
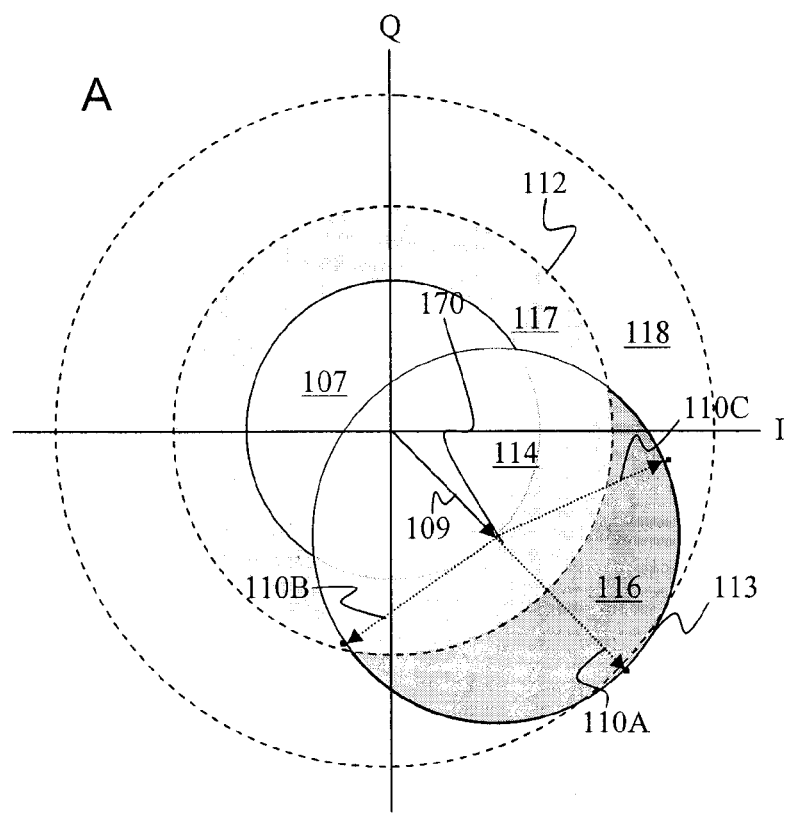
FIG. 3A is a complex plane depicting the addition of a digital vector to an analog vector in accordance with an embodiment of the present invention.
FIG. 3B is a complex plane depicting the correction of the hybrid vector in accordance with an embodiment of the present invention.
Figure 3:
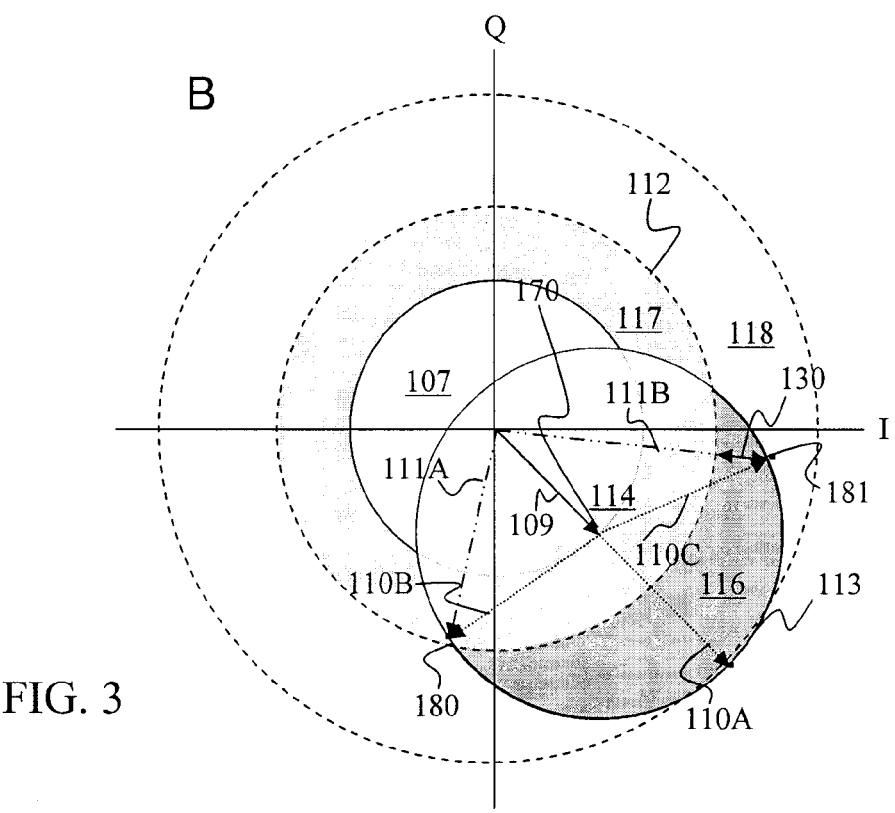

As shown in FIG. 3A, addition of a digital vector 110 to the analog vector 109 generates a circular area 113 around the analog signal point 170. The area of the circle 113 can be further divided into two sections, namely a no correction area 114 and a correction area 116. Within correction area 116, a gradient relating to the amount of correction to be applied covers the area with a large amount correction required near the section where the digital vector 110A would add to the analog vector 109 in-phase. The amount of correction required would gradually drop off as the digital vector 110A moved away from the maximum addition situation. According to the present invention, only if the sample point falls within the corrections area 116 will a correction be applied to the signal. However, a majority of the area of the circle defined by the hybrid vector 111 will not require a correction, since the sample points will fall below the maximum desired peak threshold 112. For example, as shown in FIG. 3B, sample point 180 falls below the maximum desired peak threshold 112. Since the sample point 180 is defined by the hybrid vector 111A, no correction is required since the vector 111A projects outside the correction areas 115 and 116. Conversely, using the standard PAPR reduction scheme, the same sample point would be unnecessarily clipped to within the circle 140 (see FIG. 1C).

If a sample point falls within the correction area 116, near the maximum desired threshold 112, a lower amount of correction will be required to bring the signal below the maximum desired peak threshold 112. For example, sample point 181, shown in FIG. 3B is slightly higher than the maximum desired peak threshold 112. Since the sample point 181 is defined by the hybrid vector 111B, only a slight correction is required, along the hybrid vector 111B, to bring clip the sample below the maximum desired peak threshold 112. By introducing a lower amount of correction, the peak detection method of the present invention can achieve the same maximum desired peak value with a lower degree of distortion in the original signal. This allows the signal peak to be reduced further compared to the standard method of PAPR applied only to the digital signal 101.

In situations where the hybrid vector 111 projects essentially in the same direction as the analog and digital vectors 109, 110, a large correction, essentially the same as with the standard PAPR reduction scheme, will be required.

Once the peaks have been detected, a reduction algorithm is applied to reduce the peaks to a point below the maximum desired peak threshold 112. In typical PAPR reduction schemes, peaks are reduced by adding a correction vector to the digital vector to thus reduce the magnitude of the sample point to below the maximum desired peak threshold (see FIG. 1C). In the case where a hybrid vector is used to detect the signal peaks, adding a correction vector to the hybrid vector will be sub-optimal for the eventual constellation and spectrum correction steps. Accordingly, peak correction is achieved by adding an error vector, based on the correction vector, to the digital vector component of the hybrid vector.

In the method, one threshold is used to make a decision to correction the signal and another value determines the amount of correction to be applied. This allows the peak to be over-clipped to ensure that it will not come back to such a level during the correction phase.

The person skilled in the art will readily appreciate that the signal can be corrected using any number of correction functions known in the art. For example, the correction function can be accomplished by either hard or soft clipping the digital signal portion of the hybrid signal. Hard or soft clipping adds a delta function defined by $\delta(t)\ e^{j\Phi}$ to the digital signal, where $\Phi$ represents the angle of the correction vector.

In another embodiment, the correction function may be a real or complex function, such as a complex frequency. However, the correction function should present a real point at the peak to be corrected, so that the correction angle $\Phi$ can be added to the point.

It may also be possible to compute the correction vector in parallel but opposed to the analog vector so as to preserve the phase of the analog vector. This introduces asynchronous noise to the FM modulated signal, but would allow the frequency space of the analog signal to be employed for peak correction.

A sinc ( ) function may be included in the generalized peak correction formula to allow for the delta function to be applied to the integer sample points, but can be used to shift the delta function to lie between sample points, should the actual peak not fall on discrete sample points. This can reduce the need to operate on an oversampled signal and may prove to be computationally more effective.

In one embodiment, additional oversampling for the peak detection step may be beneficial and even may allow the overall oversampling factor to be omitted. If a peak is detected in-between samples, the correction function must be shifted accordingly. In the case of clipping using a delta function, the sinc( ) function of the correction function is shifted, which provides non-zero time domain values across a larger time window.

Based on the correction vector, an error signal (representing an error from the original signal) can be generated by the following general formula:

$$|E[n]| = \sum_{K=0}^{length-1} correctionFunction\ [n-k]C[k]$$

The introduction of an error signal based on the formula identified above, allows alternate means of peak correction, such as tone injection or pulse injection. Furthermore, the correction function may even be determined adaptively and may not be the same or even static across iterations or individual peaks.

In order to limit the possibility of the peak re-emerging while correcting the constellation and spectrum, the correction vector can be extended further than normal using the above formulas. Further, the correction vector by be computed along the original digital vector, rather than to the origin. This would allow the phase of the digital signal to be preserved.

The use of an error signal to correct the hybrid signal allows the shape of the spectrum to be controlled, such that it requires less eventual constellation and spectrum correction. Furthermore, additional frequency spectrum may be used to more effectively reduce peaks. For example, if the extended carrier spectrum is not used for data carriers, it can be used to hold a larger portion of the error signal. Depending on the choice of correction function, the error signal can be small enough that the constellation and spectrum correction step may be bypassed altogether.

Modification of the digital signal in the time domain can negatively impact the signal constellation, as well as increase out-of-band noise requiring correction. Unlike the standard PAPR reduction scheme, different correction functions in the proposed method will have varying impacts on the constellation and injected noise level. Some correction functions, such as tone injection, may safely bypass the constellation and spectrum correction step.

The constellation and spectrum correction is applied to a modified version of the digital signal. Alternatively, the combined error vector, without addition to the digital vector, may be tracked and a comparable constellation and spectrum correction applied thereto. This would permit the original digital signal to pass through the steps in an unmodified form until the error vector is finally added to the digital signal. Moreover, performing correction on the error vector rather than the digital vector allows alternate means of constellation correction. For example, any of the QPSK constellation points could be rotated back in a desired boundary region rather than pushing points along the X and Y axes.

The basic steps of constellation and spectrum correction involve: removing the pulse shaping of the IBOC signal; performing an Fast Fourier Transformation (FFT) operation to demodulate the OFDM carriers; applying a frequency mask that zeros or reduces frequency bins not assigned to IBOC carriers; constraining the constellation of IBOC carrier points back toward the actual signal point up to a threshold value along both the real and imaginary axes; correcting the phase of all reference carriers; computing the Inverse Fast Fourier Transformation (IFFT) to re-modulate the signal; and re-applying pulse shaping to the symbol.

The correction of the constellation points should be performed with respect to the original Quadrature Phase Shift Keyed (QPSK) point. Basing the correction on the modified symbol itself can lead to bit errors, as the applied correction function could have moved the constellation point into another decision region.

The process may operate at sample rates greater than the standard modulator sample rate in order to detect signal peaks more accurately. The analog FM modulated signal is interpolated to that rate, while the digital signal is passed to the process in terms of carrier bitmap describing the QPSK constellation. Each carrier is represented in terms of the sign bits of the real and imaginary parts of the constellation point. An oversampled IBOC time domain symbol can be determined by filling in the constellation points based on the bitmap and inserting a zero vector prior to the IFFT step. Standard IBOC pulse shaping can be performed at the output. The carrier bitmap can also be used as a reference in the constellation/ spectrum correction step later on.

The digital signal is operated on and passed forward across iterations, but the analog signal is stored across iterations. Only on the final iteration of the method is the analog signal added to the digital signal in a permanent manner. Provided that the signal content in the FM spectrum is minimized or shaped such as to have little impact on the FM signal, then the distortion on the FM signal is minimal.

During peak reduction, the Root Mean Square (RMS) level of the digital signal is often reduced. As shown by block 300 in FIG. 3, by scaling the digital signal back to the original RMS level, the signal power can be maintained. In addition, the boundary region of the constellation during the constellation correction step is relaxed.

Optionally, each digital carrier may be equalized in both amplitude and phase using conventional equalization techniques. In this case the analog signal must be equalized prior to passing it through the PAPR reduction method and the resultant analog and digital signal should not be equalized in subsequent steps as this may change the peak characteristics.

In an embodiment, a complex random variable can be added to the standard constellation correction prior to correction. Adding a random variable may aid in finding a better solution across multiple iterations, since correction is in opposition to the peak reduction step.

As a final step in the spectrum and constellation correction method each IBOC symbol can be scaled so that each peak has a constant power within each symbol and to limit variability from symbol to symbol. The scaling level should be chosen at the median peak level such that half the symbols are scaled up and improve their constellation and half the symbols are scaled down with a slight degradation in their constellation. This additional step should assist in the predistortion process as peaks now occur at a fixed rate.

Keeping the algorithm parameters adaptive allows the algorithm to be adaptively configured for different levels of peak compression based on external input parameters. For example, if a transmitter is temporarily unable to produce a given peak power level, peaks may be compressed harder at a slight degradation in the signal constellation, but maintaining the same signal power.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

INDUSTRIAL APPLICABILITY

The present method will allow existing hybrid installations to increase their carrier levels without needing to upgrade their entire transmitter. In addition, the present method improves the improves the overall efficiency of the transmitter, and will have a positive economic impact for broadcasters.

We claim:

1. A method for peak-to-average power reduction in a hybrid signal comprising first and second separately modulated signals, the method comprising the steps of:
   obtaining a sample point of the hybrid signal;
   defining the sample point by way of a first vector corresponding to the first separately modulated signal and a second vector corresponding to the second separately modulated signal;
   adding the first vector to the second vector to obtain a hybrid vector;
   comparing the hybrid vector against a maximum desired peak threshold to identify peaks in power;
   determining an error vector that reduces the identified peaks in power of the hybrid vector to within the maximum desired peak threshold;
   adding the error vector to the second vector to reduce at least one peak in power of the identified peaks in power, and
   correcting a constellation and a spectrum of the second modulated signal following peak determination and peak reduction to yield a corrected second modulated signal, wherein said correcting of the constellation and spectrum comprises the steps of:
   demodulating the second separately modulated signal;
   correcting all carriers in the demodulated signal;
   clipping non-carriers to a mask; and
   modulating the corrected second separately modulated signal.

2. The method according to claim 1, wherein the first separately modulated signal is an analog signal and the second separately modulated signal is a digital signal.

3. The method according to claim 2, wherein the analog signal comprises a radio modulated baseband carrier and the digital signal comprises orthogonal frequency division multiplexing (OFDM).

4. The method according to claim 1, further comprising a step of oversampling the hybrid vector prior to comparing the hybrid vector against the maximum desired peak threshold.

5. The method according to claim 1, wherein the error vector is added to the second vector in a direction extending from an origin of the second vector in a complex plane representation thereof.

6. The method according to claim 5, wherein the error vector is based on a correction vector comprising a correction function that applies a delta function to the second vector.

7. The method according to claim 6, wherein the correction function comprises applying a shifted sinc function to the second vector for peak reduction in-between discrete sample points.

8. The method according to claim 6, wherein the correction function comprises applying at least one complex frequency to the second vector for tone injection at varying frequencies.

9. The method according to claim 8, wherein the at least one complex frequency is orthogonal to symbol carriers.

10. The method according to claim 6, wherein the correction function comprises applying at least one windowed complex frequency to the second vector for pulse injection at varying frequencies.

11. The method according to claim 10, wherein the at least one windowed complex frequency limits time domain impact and increases spectral impact.

12. The method according to claim 1, wherein the second vector has a length, and the error vector is added to the second vector along the length of the second vector.

13. The method according to claim 1, wherein the error vector is calculated in parallel and opposed to the first vector.

14. The method according to claim 1, further comprising a step of correcting a constellation and a spectrum of the error vector.

15. The method according to claim 1, further comprising a step of adding the first separately modulated signal to the corrected second separately modulated signal.

16. The method according to claim 15, further comprising a step of adding a complex random variable to the demodulated signal prior to correcting the carriers in the demodulated signal.

17. The method according to claim 1, wherein the step of demodulating the second separately modulated signal further comprises:
  removing pulse shaping of the second separately modulated signal; and
  applying a Fast Fourier Transformation operation on the carriers in the demodulated signal.

18. The method according to claim 1, wherein the step of modulating the corrected second separately modulated signal further comprises:
  applying an Inverse Fast Fourier Transformation to the corrected second separately modulated signal to yield a transformed signal; and
  applying pulse shaping to the transformed signal.

19. A computer readable memory having recorded thereon statements and instructions for execution by a computer adapted to carry out the method according to claim 1.

* * * * *